(12) United States Patent
Sjöö et al.

(10) Patent No.: US 6,270,294 B1
(45) Date of Patent: Aug. 7, 2001

(54) TOOL FOR PARTING AND GROOVING

(75) Inventors: Sture Sjöö; Per Hansson, both of Gävle (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/496,199

(22) Filed: Feb. 2, 2000

(30) Foreign Application Priority Data

Feb. 4, 1999 (SE) .................................................. 9900363

(51) Int. Cl.[7] .............................. B23B 27/08; B23B 29/04
(52) U.S. Cl. ........................... 407/101; 407/110; 407/117
(58) Field of Search .................................. 407/101, 109, 407/110, 117

(56) References Cited

U.S. PATENT DOCUMENTS

| 3,205,557 | * | 9/1965 | Frommelt et al. | 407/109 |
| 4,235,564 | | 11/1980 | Huser . | |
| 4,580,930 | * | 4/1986 | Zinner | 407/110 |
| 4,887,945 | * | 12/1989 | Pano | 407/110 |
| 4,938,641 | * | 7/1990 | Maier | 407/110 |
| 5,267,817 | * | 12/1993 | Englund | 407/110 |
| 5,829,923 | * | 11/1998 | Nowicki | 407/91 |

* cited by examiner

Primary Examiner—Henry Tsai
(74) Attorney, Agent, or Firm—Burns, Doane, Swecker & Mathis, L.L.P.

(57) ABSTRACT

A tool for parting or grooving includes a holder to which is mounted an adapter having an insert-receiving slot formed between support and clamping portions of the adapter. The holder includes a serration meshing with a serration of the adapter. Threaded holes are formed through the serration of the holder, and through-holes are formed in the adapter in alignment with respective holes of the holder. Screws extend through the aligned through-hole and threaded hole to secure the adapter to the holder. A slot intersects through one of the through-holes of the adapter to render the clamping portion elastically deformable. That through-hole includes a conically-shaped entrace surface, and the associated screw includes a conical head which acts as a wedge to force the clamping portion into clamping engagement with the insert.

10 Claims, 4 Drawing Sheets

TOOL FOR PARTING AND GROOVING

BACKGROUND OF THE INVENTION

This invention relates to a tool coupling of the kind that comprises a holder and an adapter for at least one cutting machining element, said adapter including a first serration intended to co-operate with a second serration of the holder, more precisely by bringing the serrations to engage each other by means of a clamping means while providing a torque resistant connection between the adapter and the holder. More specifically, the present tool is intended for parting and grooving operations.

Within the field of chip removing machining there are tool couplings of the general kind defined above for use in several different applications, however, usually in turning tools of different type. Thus under the trade name CORO-MANT CAPTO[a] (Manufacturer: Sandvik AB, Sweden) boring bars are marketed, said boring bars having such couplings. The holder constitutes for instance a bar for a cutting head mountable in a multi-purpose lathe, said cutting head having one or more machining elements in the shape of exchangeable inserts. In connection with previously known boring bars of this kind a first serration is provided at an essentially planar inner end surface of the cutting head, while a co-operating second serration is provided at an external or free end surface of the bar. In order to bring the serrations into engagement with each other several loose screws are used as clamping means, said screws having an enlarged head and being tightened in axial threaded holes that open in the serrated surface of the free end of the bar. More precisely, in this end surface of the bar, four equidistant separated holes are recessed, of which both of the two upper holes receive screws that are inserted through holes formed in the cutting head, and one or the other of the two lower holes receives a screw, depending on whether the cutting head in question is of a left-hand type or a right-hand type.

By the presence of the above-mentioned serrations in the two end surfaces of the bar and the cutting head respectively, said serrations being urged against each other, a very reliable, torque resistant connection is achieved between the bar and the cutting head. This in turn guarantees that the active insert is given and maintains a correct position. However, a disadvantage in connection with the previously known tool coupling is that the exchange of the cutting head is complicated and time-consuming. Thus, not less than three screws must initially be loosened and then again tightened to complete a tool exchange, which might take several minutes. The tool exchanges become especially difficult in such cases when the screws are hard to reach and/or have chips, dirt, grease deposits or the like in their key recesses. Under such circumstances the operational shutdowns for tool exchanges may be very time-consuming and expensive. Further, there is a risk that screws are lost since they must be loosened completely in order to allow dismounting of the cutting head.

A tool coupling using co-operating serrations in combination with screws such as clamping means in parting tools is disclosed in Swedish Patent Application No. 7813038-2. In this case the number of screws for clamping the adapter and the holder is three. This means that the activity of first disengaging three comparatively long screws and subsequently tightening them again when insert change is needed for indexing a new cutting edge, is very time consuming. Further, there is a risk that screws become lost since they must be loosened completely.

OBJECTS AND FEATURES OF THE INVENTION

The present invention aims at removing the shortcomings mentioned above in connection with previously known tool couplings of the type in question and at providing an improved coupling. Thus, a primary object of the invention is to create a tool coupling by means of which the necessary cutting insert exchanges are effected in a quick and simple way without dismounting each clamp screw in its entirety. A further object is to create a tool coupling that makes it possible to design one and the same holder in such a way to allow dismounting without a risk that the clamp screws are lost. Still a further object of the invention is to create a tool coupling where during dismounting there is no need for separate key means.

According to the invention at least the primary object is attained by a tool which comprises a holder, an adapter, and fastener screws. The holder includes a serrated holder surface, and a plurality of threaded holes extending into the serrated holder surface. The adapter is mounted on the holder. The adapter is thinner than the holder and includes a serrated adapter surface meshing with the serrated holder surface to provide a torque-resistant connection between the adapter and the holder. The adapter further includes a forward slot formed between a support portion and a clamp portion of the adapter. Through-holes extend through the adapter and are aligned with respective ones of the threaded holes. A rear slot extends through a first of the through-holes to render the clamp portion elastically movable. The first through-hole has a conical entry surface. The fastener screws extend through respective ones of the through-holes and are threaded in respective ones of the threaded holes for securing the adapter to the holder. A first of the screws extends through the first through-hole and includes a conical head engaging the conical entry surface such that a tightening of the first screw displaces the clamp portion toward the support portion.

DETAILED DESCRIPTION OF PREFERRED EMBODIMENTS OF THE INVENTION

Figure 1:
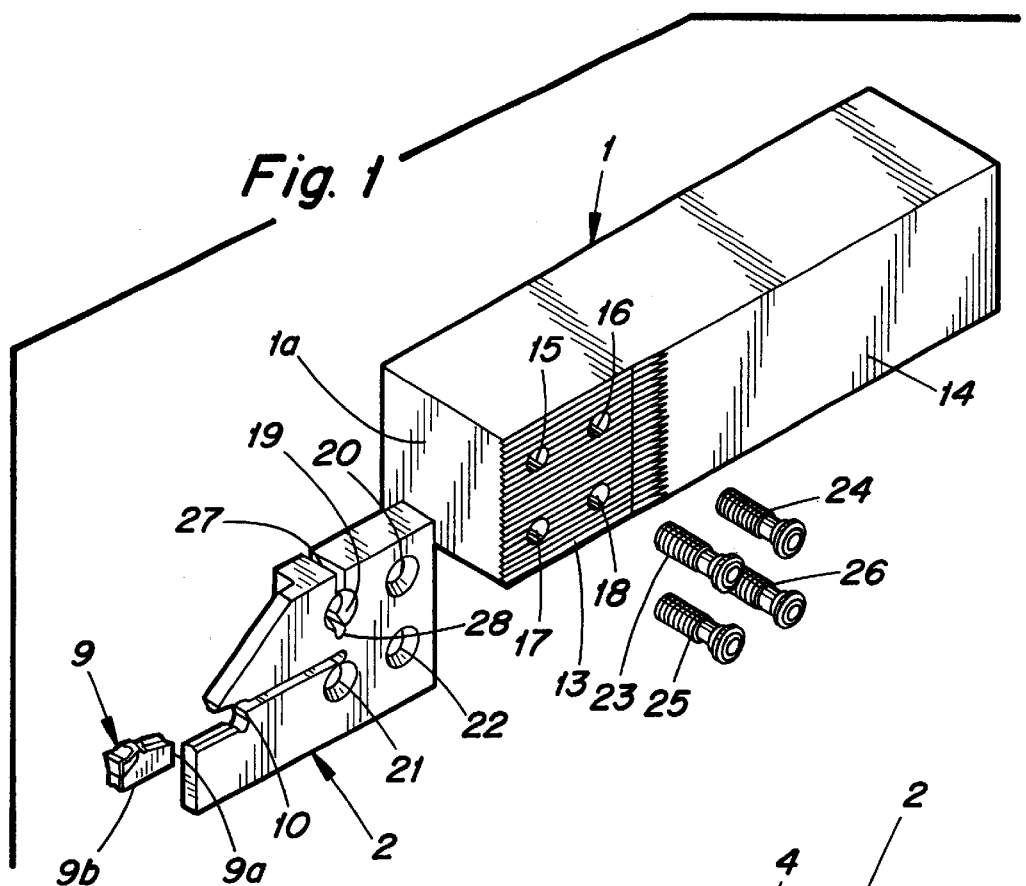
FIG. 1 is a perspective exploded view showing a tool coupling according to an embodiment of the invention, including a holder and an adapter in the form of a cutting head, said holder as well as the adapter being schematically illustrated.
Figure 2:
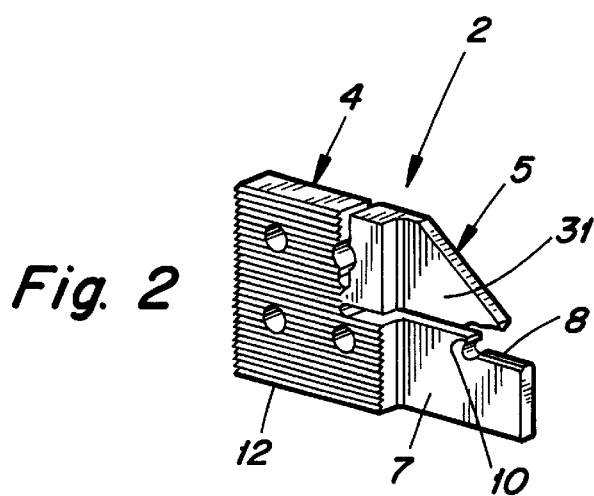
FIG. 2 is a separate perspective view of the adapter.
Figure 3:
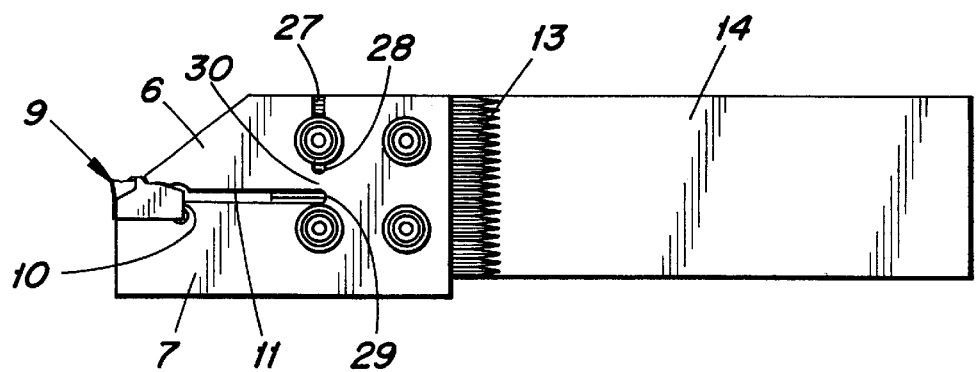
FIG. 3 is a side view of a holder and an adapter engaged therewith according to the embodiment in FIGS. 1–2.

FIGS. 1–3 show a holder 1 exhibiting a forward end surface 1a perpendicularly towards the central longitudinal axis of the holder, and 2 signifies an adapter. Holder 1, which in practice is called a basic holder, includes a rear portion intended to be connected to a tooling machine such as a multi-purpose lathe and a forward portion to which the adapter 2 is connected. The adapter consists of a blade shaped cutting head which comprises a rear connecting portion 4 and an integral forward portion 5 with smaller width than said rear portion 4, said forward part 5 having an upper clamp portion 6 and a lower support portion 7, with a clamping slot 8 therebetween for the receipt of an insert 9 for chip forming machining. The insert's rear end surface 9a is intended to abut against a shoulder 10, which limits its axial rear displacement. The shoulder 10 extends from the lower support portion 7 of the forward adapter portion 5. The clamping slot 8 transforms rearwardly into a slot extension 11 with considerably smaller height than the forward slot 8. Distinguishing is also that lower surface 9b of the cutting insert is oriented in a direction perpendicularly towards rear end surface 9a of the insert and that said lower surface 9b simultaneously is parallel with the feed direction and of the longitudinal direction of said holder 1.

On a rear side surface of a rear part 4 of the adapter, not visible in FIG. 1, is formed a serration 12 (see FIG. 2), which extends in the longitudinal direction of the adapter 2. By "serration" is meant a set of alternating parallel grooves and ridges. A corresponding serration 13 is formed on a forward side surface 14 of the holder 1. This serration 13 extends parallel with the longitudinal axis of said holder.

The holder 1 is in its cross direction formed with a first hole 15 and second hole 16, situated at the same elevation and parallel with each other and extending into serration 1 3. In a corresponding manner and with corresponding mutual positions, a third hole 17 and a fourth hole 18 are provided at the same elevation and in positions underneath said holes 15, 16.

The blade-shaped adapter 2 has likewise been provided with four holes 19, 20, 21, 22, of which the two first mentioned holes 19, 20 are situated at a distance from each other whilst at same elevation with each other. In a correspondingly manner the lower holes 21, 22 are situated at a distance from each other while at the same elevation as each other. Holes 19 and 21 are provided such that vertical planes containing their respective axes coincide respectively with vertical planes containing the axes of the second holes 20, 22. All four holes 19, 20, 21, 22 terminate in the external side surface of the adapter via conically developed entry surfaces (see FIG. 1). Four screws 23, 24, 25, 26 are each provided with a conical head so as to fit in holes 19, 20, 21, 22 and so as to be able to threadingly engaged in holes 15, 16, 17, 18 in the holder 1.

In accordance with the invention the holder 1 is provided with a slot 11 oriented parallel with said holder's longitudinal direction such that it extends from the insert site 8 to a position between holes 19 and 21 in the adapter's rear part 4. In addition there is a second or rear slot 27 in said rear portion 4 which extends at a right angle to said first slot 11. This second slot 27 is formed that it has an inner end portion 28 situated at a position between holes 19 and 21 in the adapter. Also said slot 11 has an inner end portion 29 situated between holes 19, 21 and at a short distance beneath said end portion 28 of said second slot 27. The second slot 27 is arranged such that it extends centrally through hole 19 in the adapter 2. In this manner between said inner end portions 28, 29 of said slots 11 and 27 there is defined a hinge portion 30. This enables a simple clamping of the insert 9 placed into the insert site 8, through a tightening of clamp screw 23, which causes an enlargement of the slot 27 through co-operation between the conical head of the screw 23 and a corresponding conical entry surface of the hole 19 in the adapter. This affects said hinge portion 30 such that the insert 9 is clamped by the forward clamp portion 6 of said forward blade portion 4 of the adapter, which is brought into clamping engagement with the upper side of said insert 9.

Figure 4:
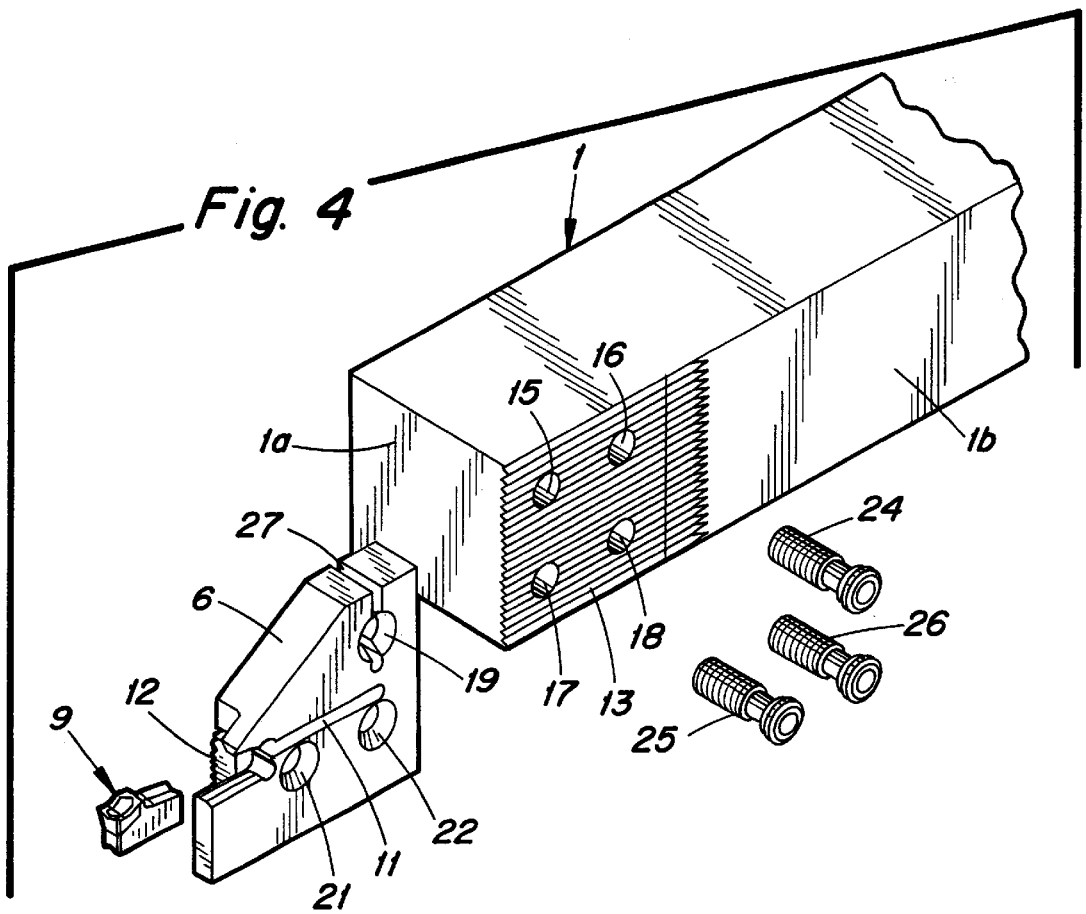
FIG. 4 is a perspective view of a holder and an adapter according to an alternative embodiment of the invention.
Figure 5:
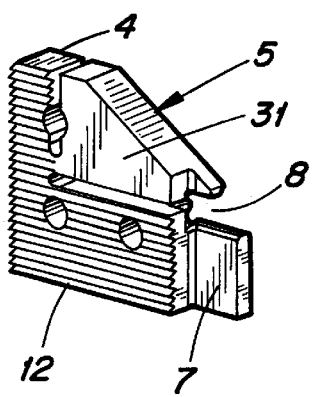
FIG. 5 is a separate perspective view of the adapter in FIG. 4.

In FIGS. 4–5 there is shown an alternative embodiment of a tool according to invention, intended for situations where only short grooving depth is needed. In this case there is required only three clamp screws 24, 25 and 26 and three corresponding holes 16–18 in the adapter 2. The upper situated hole 15, located closest to the insert 9 in the holder, becomes inactive. The two lower holes 21 and 22 have here been given such placement that both become situated in positions directly under the slot 11. As best appears from FIG. 5, with the adapter 2 in a clamped position, the arrangement is such that the slot 11 in its entirety becomes situated in a position axially rearwardly of the forward end surface 1a of the holder 1.

Figure 7:
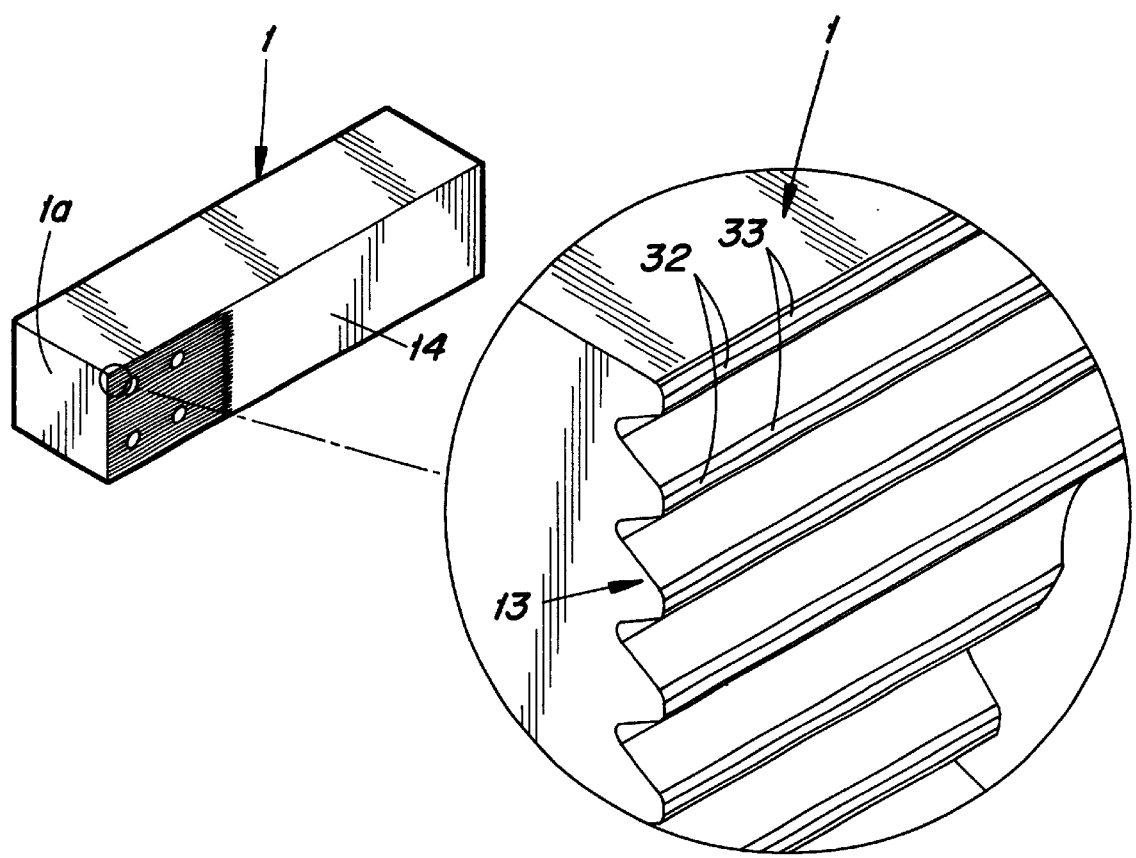
FIG. 7 is an enlarged view of a part of the serration on the holder according to invention.

As appears from FIG. 2 and FIG. 5 no serration is formed on an inner side surface 31 of the upper clamp portion 6, which abuts against side surface of the holder. That is, the torque-resistant connection defined by the intermeshing relationship between the serrations 12 and 13 is absent from the clamp portion 6. The purpose for this is to enable a certain vertical movement as well as resilience of clamp portion 6. The said non-serrated inner side surface is wholly smooth. In order to guarantee the best possible sideways rigidity of clamp portion 6, said serration 13 of the side surface of holder 1 should have an appearance according to FIG. 7, implying that the profile of each of the serration ridges 34 comprises a top portion formed by a number of smooth surface segments 32, 33, which are flat and extend parallel to in the holder's longitudinal direction and intersect each other at an obtuse angle. The surface segment 32 is oriented parallel with the side surface 14 of said holder 1. This enables an advantageous and safe surface-to-surface contact between the side surface 31 of upper clamp portion 6 and the ridges of the serration 13.

Figure 6:
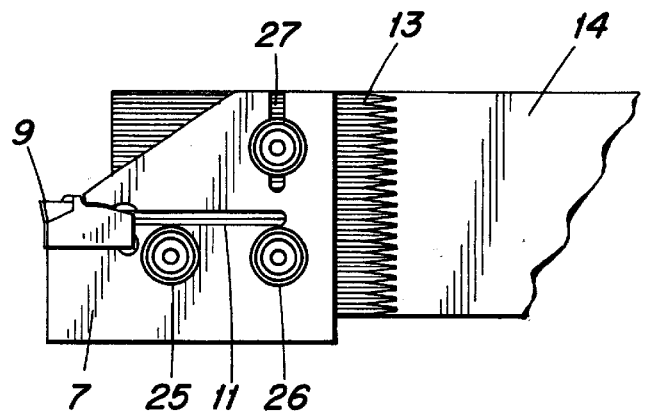
FIG. 6 is a side view of the tool shown in FIG. 4.
Figure 8:
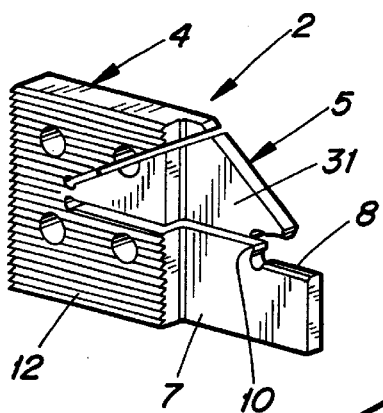
FIG. 8 shows a perspective view of an adapter of an alternative embodiment.
Figure 9:
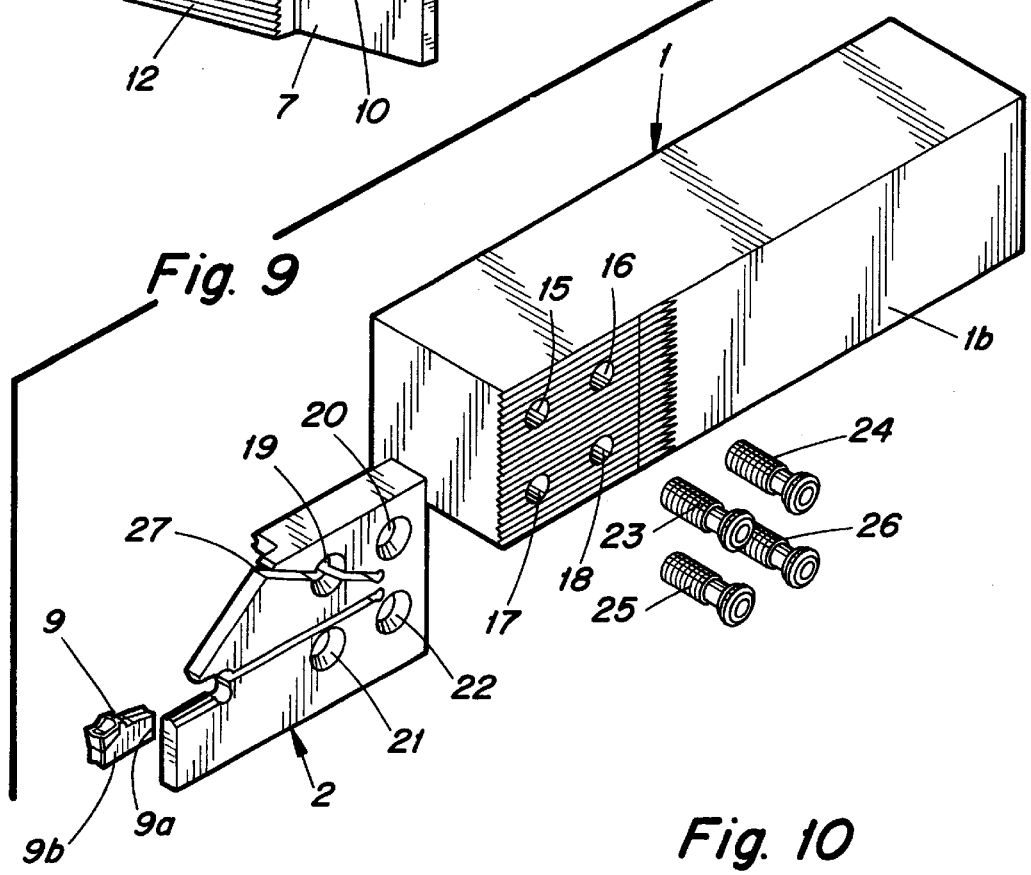
FIG. 9 shows a perspective view of a holder and adapter, as shown in FIG. 8, of an alternative embodiment.
Figure 10:
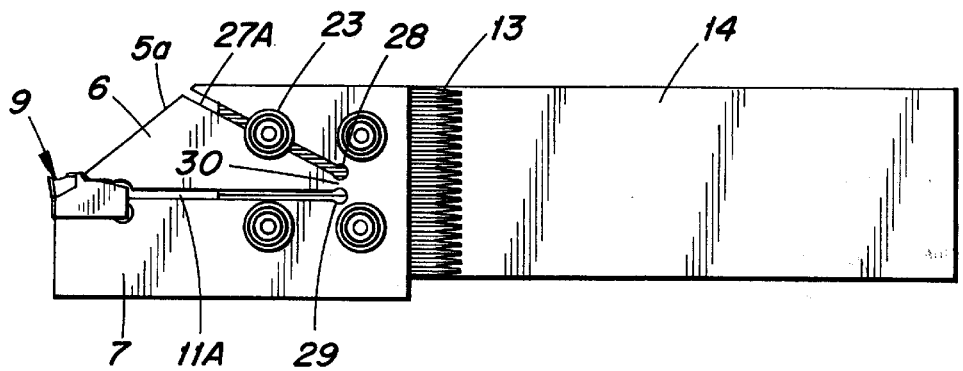
FIG. 10 shows a side view of the embodiment of FIGS. 8–9.

In FIGS. 8–10 there is shown another alternative embodiment of the invention. In similarity with the embodiment of FIGS. 4–6 there is no serration formed on that surface of the upper clamp portion 6 which abuts against the upper surface of the insert 9. However, the adapter 4 is provided with four holes 19, 20, 21, 22 similar to FIG. 1 for the receipt of screws. Further, the rear vertical slot 27 of FIGS. 4–6 is now replaced by an obliquely extending slot 27A which extends of an angle of 40–50° from the holder's longitudinal axis, and it extends from a closed inner end portion 28 to a forward open end 27a located at the forwardly sloping mantle surface 5a of the forward clamp portion 5. Also, in this case the inner end portions 28, 29 of slots 11A and 27A are located to provide a hinge portion 30 that is situated slightly forward of a vertical plane extending through the central axis of the holes 20 and 22 of the adapter 2. This embodiment gives improved leverage due to the location of screw 23 and its distance from the hinge area 30. This is of advantage in tools with larger dimensions.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool comprising:
   a holder including a holder surface, and a plurality of threaded holes extending into the holder surface;

an adapter mounted on the holder, the adapter being thinner than the holder and including a front slot adapted to receive a cutting insert, the adapter comprising:

an adapter surface opposing the serrated holder surface, the holder surface and the adapter surface including serrations arranged in intermeshing relationship to provide a torque-resistant connection between the adapter and the holder, a front slot adapted to receive a cutting insert, the front slot formed between a support portion and a clamp portion of the adapter, the clamp portion forming a portion of the slot, a plurality of through-holes extending through the adapter and aligned with respective ones of the threaded holes, and a rear slot extending through one of the through-holes , wherein the clamp portion extends forwardly from the rear slot, the torque-resistant connection being absent from the clamp portion to render the clamp portion elastically movable relative to the holder, the first through-hole having a conical entry surface; and fastener screws extending through respective ones of the through-holes and threaded in respective ones of the threaded holes for securing the adapter to the holder, a first of the screws extending through the torque resistant connection, and a second of the screws extending through the one through-hole and including a conical head engaging the conical entry surface such that a tightening of the second screw displaces the clamp portion toward the support portion.

2. The tool according to claim 1 wherein the front slot includes a slot extension extending perpendicular to the rear slot.

3. The tool according to claim 1 wherein the through-holes through which the second and first screws extend are respectively disposed above and below rear ends of the rear slot and the slot extension, those rear ends being spaced apart in a direction transversely of the slot extension whereby a portion of the adapter disposed between those rear ends defines a hinge for the clamp portion.

4. The tool according to claim 1 wherein a rear portion of the adapter has a larger thickness than the clamp portion.

5. The tool according to claim 1 wherein the support portion forms a shoulder located in the front slot and which forms a rear stop for an insert.

6. The tool according to claim 1 wherein a lower surface of the front slot extends parallel to a longitudinal direction of a serration of the holder.

7. The tool according to claim 1 wherein the holder includes a front surface, the entire length of the slot extension located rearwardly of the front surface.

8. The tool according to claim 1 wherein a serrated portion of the holder surface includes parallel ridges, each ridge having a top portion comprised of a planar ridge surface arranged parallel to, and contacting, a planar inner surface of the clamp portion to form a surface-to-surface contact therewith.

9. The tool according to claim 1 wherein the front slot includes a slot extension, the rear slot forming an acute angle in the range of 40–50° with the slot extension.

10. The tool according to claim 8 wherein each ridge further includes a pair of additional planar surfaces intersecting respective edges of the planar ridge surface, each additional surface forming an obtuse angle with the planar ridge surface.

* * * * *